United States Patent
Dorogy et al.

(10) Patent No.: US 7,498,117 B2
(45) Date of Patent: Mar. 3, 2009

(54) SYSTEM AND METHOD FOR RADIATION IMAGING BY IN-SITU PARTICLE FORMATION

(75) Inventors: William Dorogy, Newburyport, MA (US); Sterling Chaffins, Corvallis, OR (US); Michael J Day, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 11/264,620

(22) Filed: Oct. 31, 2005

(65) Prior Publication Data

US 2007/0099109 A1 May 3, 2007

(51) Int. Cl.
*G03C 5/00* (2006.01)
*G03F 7/00* (2006.01)
*G03F 7/004* (2006.01)

(52) U.S. Cl. .............. 430/292; 430/330; 430/346; 430/496.1; 430/616; 430/620; 430/964

(58) Field of Classification Search .......... 430/292, 430/330, 346, 495.1, 616, 620, 964
See application file for complete search history.

(56) References Cited

U.S. PATENT DOCUMENTS

| | | | |
|---|---|---|---|
| 4,260,677 A * | 4/1981 | Winslow et al. ............. 430/618 |
| 4,338,303 A * | 7/1982 | Nagel et al. ................. 424/607 |
| 5,436,108 A * | 7/1995 | Freedman et al. ........... 430/200 |
| 5,652,195 A | 7/1997 | Horsten et al. |
| 5,738,960 A | 4/1998 | Abe |
| 5,738,973 A | 4/1998 | Abe |
| 5,824,450 A | 10/1998 | Abe |
| 6,329,035 B1 | 12/2001 | Iwasaki et al. |
| 6,348,239 B1 * | 2/2002 | Hill et al. ................... 427/533 |
| 6,524,767 B1 * | 2/2003 | Ray et al. ................. 430/273.1 |
| 6,783,832 B2 | 8/2004 | Shintani et al. |
| 2004/0191423 A1 * | 9/2004 | Ruan et al. .................. 427/554 |
| 2005/0250051 A1 * | 11/2005 | Kim et al. ................... 430/322 |

* cited by examiner

*Primary Examiner*—Amanda C. Walke

(57) ABSTRACT

A radiation image-able coating includes a curable polymer matrix, a metal complex disposed in the curable polymer matrix, wherein the metal complex is configured to form localized metallic particles when exposed to heat.

30 Claims, 3 Drawing Sheets

SYSTEM AND METHOD FOR RADIATION IMAGING BY IN-SITU PARTICLE FORMATION

BACKGROUND

Compositions that produce a color change upon exposure to energy in the form of light or heat are of great interest in generating images on a variety of substrates. For example, data storage media provide a convenient way to store large amounts of data in stable and mobile formats. Optical discs, such as compact discs (CDs), digital video discs (DVDs), or other discs allow a user to store relatively large amounts of data on a single relatively small medium. Traditionally, commercial labels were printed onto optical discs by way of screen printing, adhesive labels, or other similar methods to aid in identification of the contents of the disc.

Recent efforts have been directed to providing consumers with the ability to store data on optical discs using drives configured to burn data on recordable compact discs (CD-R), rewritable compact discs (CD-RW), recordable digital video discs (DVD-R), rewritable digital video discs (DVD-RW), and combination drives containing a plurality of different writeable drives, to name a few. The optical discs used as storage mediums frequently have two sides: a data side configured to receive and store data and a label side. The label side is traditionally a background on which the user handwrites information to identify the disc.

SUMMARY

A radiation image-able coating includes a curable polymer matrix, a metal complex disposed in the curable polymer matrix, wherein the metal complex is configured to form localized metallic particles when exposed to heat.

Additionally, according to one exemplary embodiment, a method for forming a radiation image-able coating includes preparing a curable polymer matrix, dispersing a metal complex in the curable polymer matrix, wherein the metal complex is configured to form localized metallic particles when exposed to heat.

BRIEF DESCRIPTION OF THE DRAWINGS

The accompanying drawings illustrate various embodiments of the present system and method and are a part of the specification. The illustrated embodiments are merely examples of the present system and method and do not limit the scope of the disclosure.

Throughout the drawings, identical reference numbers designate similar, but not necessarily identical, elements.

DETAILED DESCRIPTION

The present exemplary systems and methods provide for the preparation and imaging of a coating via the formation of metallic particles. In particular, a curable radiation image-able coating is described herein that includes metal complexes which, when selectively imaged with a radiation generating device, are reduced to form a desired image consisting of metallic particles. According to one exemplary embodiment, the present curable radiation image-able coating includes antenna dyes dispersed and/or dissolved in the coating to aid in the selective reduction of the metal complexes with radiation generating devices. Further details of the present coating, as well as exemplary methods for forming the coatings on a desired substrate will be described in further detail below.

As used in the present specification, and in the appended claims, the term "radiation image-able discs" is meant to be understood broadly as including, but in no way limited to, audio, video, multi-media, and/or software discs that are machine readable in a CD and/or DVD drive, or the like. Non-limiting examples of radiation image-able disc formats include, writeable, recordable, and rewriteable discs such as DVD, DVD-R, DVD-RW, DVD+R, DVD+RW, DVD-RAM, CD, CD-ROM, CD-R, CD-RW, and the like.

For purposes of the present exemplary systems and methods, the term "color" or "colored" refers to absorbance and reflectance properties that are preferably visible, including properties that result in black, white, or traditional color appearance. In other words, the terms "color" or "colored" includes black, white, and traditional colors, as well as other visual properties, e.g., pearlescence, reflectivity, translucence, transparency, etc.

Additionally, as used herein, the phrase "metal complex" is meant to be understood broadly as any number of metallic molecules (atoms, ions, etc.) associated together by an electron interaction. As used herein, metal complexes may be reduced to metallic particles with the application of sufficient heat and/or energy.

In the following description, for purposes of explanation, numerous specific details are set forth in order to provide a thorough understanding of the present systems and methods for forming a radiation image-able coating that facilitates in-situ metal or metal oxide particle formation. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
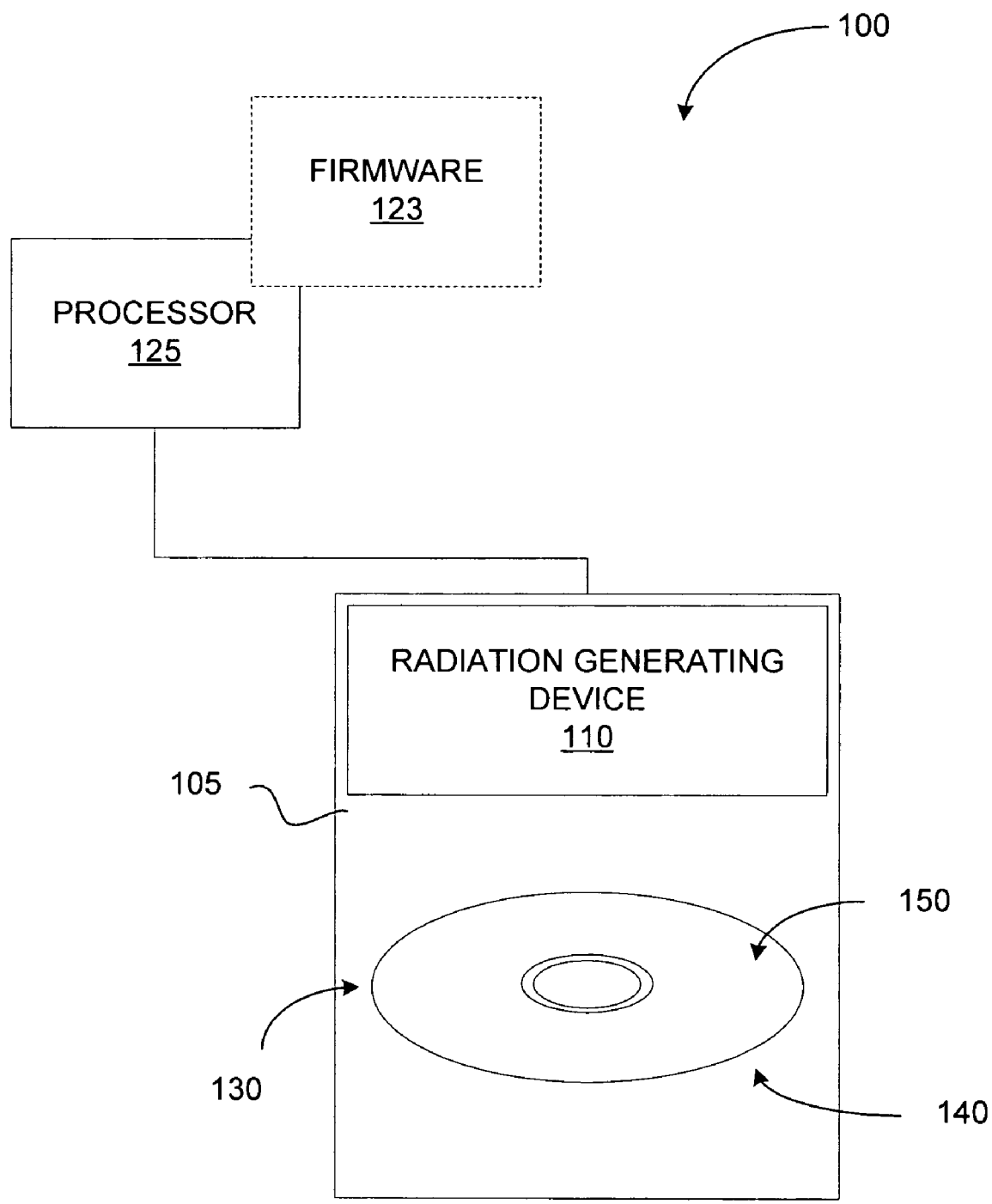
FIG. 1 illustrates a schematic view of a media processing system according to one exemplary embodiment.

FIG. 1 illustrates a schematic view of a media processing system (100), according to one exemplary embodiment. As will be described in more detail below, the illustrated media processing system (100) allows a user, among other things, to selectively expose a radiation image-able surface with radiation, register an image on the coatings, and use the imaged object for a variety of purposes such as object identification. For example, according to one exemplary embodiment, a radiation image-able data storage medium (radiation image-able disc) may be inserted into the media processing system (100) to have data stored and/or a graphic image formed thereon. As used herein, for ease of explanation only, the present radiation image-able coating will be described in the context of coating an optical disc such as a compact disc (CD) or a digital video disc (DVD). However, it will be understood that the present radiation image-able coating may be applied to any number of desired substrates including, but in no way limited to, polymers, papers, metal, glass, ceramics, and the like.

As illustrated in FIG. 1, the media processing system (100) includes a housing (105) that houses one or more radiation generating device(s) (110), which may be controllably coupled to a processor (125). The operation of the radiation generating device (110) may be controlled by the processor (125) and firmware (123) configured to selectively direct the operation of the radiation generating device. The exemplary media processing system (100) also includes hardware (not shown), such as spindles, motors, and the like, for selectively placing a radiation image-able disc (130) in optical communication with the radiation generating device (110). The operation of the hardware (not shown) may also be controlled by firmware (123) accessible by the processor (125). The above-mentioned components will be described in further detail below.

As illustrated in FIG. 1, the media processing system (100) includes a processor (125) having firmware (123) associated therewith. As shown, the processor (125) and firmware (123) are communicatively coupled to the radiation generating device (110), according to one exemplary embodiment. Exemplary processors (125) that may be associated with the present media processing system (100) may include, without limitation, a personal computer (PC), a personal digital assistant (PDA), an MP3 player, or other such device. According to one exemplary embodiment, any suitable processor may be used, including, but in no way limited to a processor configured to reside directly on the media processing system. Additionally, as graphically shown in FIG. 1, the processor (125) may include firmware (123) such as software or other drivers associated therewith, configured to control the operation of the radiation generating device (110) to selectively apply radiation to the data storage medium (130). According to one exemplary embodiment, the firmware (123) configured to control the operation of the radiation generating device (110) may be stored on a data storage device (not shown) communicatively coupled to the processor (125) including, but in no way limited to, read only memory (ROM), random access memory (RAM), and the like.

As introduced, the processor (125) is configured to controllably interact with the radiation generating device (110). While FIG. 1 illustrates a single radiation generating device (110), any number of radiation generating devices may be incorporated in the media processing system (100). According to one exemplary embodiment, the radiation generating device (110) may include, but is in no way limited to a plurality of lasers configured for forming data on a CD and/or DVD, such as in a combo CD/DVD recording drive. More specifically, a combo CD/DVD recording drive configured to record on more than one type of media may be incorporated by the media processing system (100). For example, a DVD-R/RW (+/−) combo drive is also capable of recording CD-R/RW, for example. In order to facilitate recording on more than one type of media, these combo CD/DVD recording drives include more than one laser. For example combo CD/DVD recording drives often contain 2 recording lasers: a first laser operating at approximately 780 nm for CD recordings and a second laser operating at approximately 650 nm for DVD recordings. Accordingly, the present media processing system (100) may include any number of lasers having wavelengths that may vary from between approximately 200 nm to approximately 1200 nm.

As mentioned previously, the present media processing system (100) includes a data storage medium in the form of a radiation imageable disc (130) disposed adjacent to the radiation generating device (110). According to one exemplary embodiment, the exemplary radiation image-able disc (130) includes first (140) and second (150) opposing sides. The first side (140) has a data surface formed thereon configured to store data while the second side (150) includes a radiation image-able surface having a metal complex color forming composition.

With respect to the first side (140) of the radiation image-able disc (130), the radiation generating device (110) may be configured to read existing data stored on the radiation image-able disc (130) and/or to store new data on the radiation image-able disc (130), as is well known in the art. As used herein, the term "data" is meant to be understood broadly as including the non-graphic information digitally or otherwise embedded on a radiation image-able disc. According to the present exemplary embodiment, data can include, but is in no way limited to, audio information, video information, photographic information, software information, and the like. Alternatively, the term "data" may also be used herein to describe information such as instructions a computer or other processor may access to form a graphic display on a radiation image-able surface.

In contrast to the first side of the radiation image-able disc (130), the second side of the radiation image-able disc (140) includes a radiation image-able coating incorporating metal complexes configured to selectively form metallic particles. According to one exemplary embodiment, discussed in further detail below, the second side of the radiation image-able disc (140) includes a resin solution such as a curable polymer matrix, a metal complex configured to form metallic particles when exposed to sufficient heat, and at least one antenna dye uniformly distributed in the resin solution to aid in the selective reduction of the metal complex. Further details of the radiation image-able coating will be provided below.

Exemplary Coating Formulation

As mentioned above, the second side of the radiation image-able disc (140) includes a number of components forming a coating configured to be imaged by one or more lasers emitting radiation at a known wavelength. According to one exemplary embodiment, the radiation image-able coating includes, but is in no way limited to, a resin such as a curable polymer matrix, a number of metal complexes dissolved and/or distributed in the resin, and an antenna dye package uniformly distributed/dissolved in the resin to sensitize the resulting coating to radiation of a known wavelength. According to one exemplary embodiment, the present antenna dye package includes at least one IR absorbing dye having a radiation absorbance maximum associated with a radiation imaging device. Each of the components of the present radiation image-able coating will be described in detail below.

As mentioned, the present exemplary radiation image-able coating includes a resin such as a curable polymer matrix. While the present curable polymer matrix may employ any number of curing mechanisms such as chemically induced free-radical generation, thermal solvent evaporation, or chemical chain extending and/or cross-linking reactions, according to one exemplary embodiment, the curable polymer matrix includes a radiation curable polymer, such as a lacquer, configured to form a continuous phase, referred to herein as a matrix phase, when exposed to light having a specific wavelength and/or heat of a specific temperature. More specifically, according to one exemplary embodiment, the radiation curable polymer may include, by way of example, UV-curable matrices such as acrylate derivatives, oligomers, and monomers, with a photo package dissolved in a solvent. A photo package may include a light absorbing species, such as photoinitiators, which initiate reactions for curing of the polymer, such as, by way of example, benzophenone derivatives. Other examples of photoinitiators for free radical polymerization monomers and pre-polymers include, but are not limited to, thioxanethone derivatives, anthraquinone derivatives, acetophenones, benzoine ethers, and the like.

According to one exemplary embodiment, the curable polymer matrix may be chosen such that curing is initiated at a temperature insufficient to reduce the metal complexes into metallic particles. According to one exemplary embodiment, curing of the polymer matrix is performed at a temperature less than approximately 100° C. Specifically, according to one exemplary embodiment, the radiation-curable polymer matrix is cured by a form of radiation that does not cause reduction of the metal complexes present in the coating. For example, the radiation-curable polymer matrix may be chosen such that the above-mentioned photo package initiates reactions for curing of the polymers when exposed to a light having a different wavelength than that of the IR absorbing antenna dye package. Matrices based on cationic polymerization resins may include photoinitiators based on aromatic diazonium salts, aromatic halonium salts, aromatic sulfonium salts and metallocene compounds. A suitable lacquer or matrix may also include Nor-Cote CLCDG-1250A (a mixture of UV curable acrylate monomers and oligomers) which contains a photoinitiator (hydroxyl ketone) and organic solvent acrylates, such as, methyl methacrylate, hexyl methacrylate, beta-phenoxy ethyl acrylate, and hexamethylene acrylate. Other suitable components for lacquers or matrices may include, but are not limited to, acrylated polyester oligomers, such as CN293 and CN294 as well as CN-292 (low viscosity polyester acrylate oligomer), trimethylolpropane triacrylate commercially known as SR-351, isodecyl acrylate commercially known as SR-395, and 2(2-ethoxyethoxy)ethyl acrylate commercially known as SR-256, all of which are available from Sartomer Co.

Additionally, a number of metal complexes may be distributed or at least partially dissolved in the radiation curable matrix. According to one exemplary embodiment, the metal complexes may be present in the form of any metal complex capable of undergoing rapid reduction to metallic particles at temperatures of between 80 and 250° C. As used herein, the term "metallic particles" shall be understood broadly as including any particles having a metal, a metal oxide, or a metal sulfide constituent. More specifically, the metal complexes that may be included in the present coating include, but are in no way limited to, a silver tetraglyme complex configured to form silver particles when heated. According to one embodiment, the silver tetraglyme complex includes a silver hexafluoroacetylacetonate tetraglyme. During image formation, ligands present in the silver tetraglyme complex may be removed at temperatures under approximately 200° C. to form metal particles. If the localized temperature is then increased above approximately 220° C., the particles will be sintered together to form a conductive pattern. Once the metal particulates are formed and/or sintered, they may then be oxidized to form a metal oxide, if desired. According to one embodiment of the present exemplary system and method, the above-mentioned metal complex is uniformly dispersed/distributed in the polymer matrix, as will be described in further detail below.

In addition to the above-mentioned components, the coating includes a UV absorbing antenna dye configured to sensitize the resulting coating to a known radiation emission wavelength, thereby providing maximum heating efficiency. According to one exemplary embodiment, the antenna dye(s) comprise a number of radiation absorbers configured to optimize the generation and transfer of heat to the metal complex upon exposure to radiation at a predetermined exposure time, energy level, wavelength, etc. More specifically, the radiation absorbing antenna dye(s) may act as a UV energy absorbing antenna providing energy to surrounding areas of the resulting coating upon interaction with an energy source of a known wavelength. Once UV or other radiation energy is received by the radiation absorbing antenna dye(s), the radiation is converted to heat to remove ligands and form metallic silver which selectively induces image formation. However, radiation absorbing dyes have varying absorption ranges and varying absorbance maximums where the antenna dye will convert energy most efficiently from a radiation source. Generally speaking, a radiation antenna that has a maximum light absorption at or in the vicinity of a desired development wavelength may be suitable for generating sufficient heat to reduce the metal complexes of the present exemplary systems and methods. Specifically, according to one exemplary embodiment, the radiation antenna may be configured to generate localized temperatures between approximately 80 and 250° C. when selectively exposed to a corresponding radiation source.

As the radiation generating device (110) of the media processing system (100) operates at a predetermined frequency, matching the radiation absorbing energy antenna to the radiation wavelengths and intensities of the radiation generating device can optimize the image formation system. Optimizing the system includes a process of selecting components of the color forming composition that can result in a rapidly developable composition under a fixed period of exposure to radiation at a specified power.

According to one exemplary embodiment, the present image-able coating includes an antenna package uniformly distributed/dissolved in the coating. According to the present exemplary embodiment, the antenna dye(s) included in the present antenna package may be selected from a number of radiation absorbers such as, but not limited to, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof. Other suitable antennas can also be used in the present exemplary system and method and are known to those skilled in the art and can be found in such references as "Infrared Absorbing Dyes", Matsuoka, Masaru, ed., Plenum Press, New York, 1990 (ISBN 0-306-43478-4) and "Near-Infrared Dyes for High Technology Applications", Daehne, Resch-Genger, Wolfbeis, Kluwer Academic Publishers (ISBN 0-7923-5101-0), both incorporated herein by reference.

As mentioned previously, image formation efficiency is maximized when the antenna dye(s) of the antenna package have absorbance maximums approximately matching the wavelength of the radiation generating device (110). According to one exemplary embodiment, the media processing system (100) may include a radiation generating device configured to produce one or more digital video disc (DVD) type lasers with wavelength values of approximately 650 nm, compact disc type lasers with wavelength values of approximately 780 nm, and/or blue and indigo laser devices having wavelength values between approximately 300 nm to approximately 600 nm. Exemplary dyes for each wavelength are provided in detail below.

As mentioned, a number of dyes having varying absorbance maximums may be used in the above-mentioned coatings to act as radiation absorbing antenna dyes. According to one exemplary embodiment, radiation absorbing antenna dyes having absorbance maximums at approximately 780 nm that may be incorporated into the present antenna dye package include, but are in no way limited to, indocyanine IR-dyes such as IR780 (Aldrich 42,531-1)(1)(3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9CI)), IR783 (Aldrich 54,329-2)(2) (2-[2-[2-Chloro-3-[2-[1,3-dihydro-3,3-dimethyl-1-(4-sulfobutyl)-2Hindol-2-ylidene]-ethylidene]-1-cyclohexen-1-yl]-ethenyl]-3,3-dimethyl-1-(4-sulfobutyl)-3H-indolium hydroxide, inner salt sodium salt). Additionally, phthalocyanine or naphthalocyanine IR dyes such as Silicon 2,3-naphthalocyanine bis(trihexylsiloxide) (CAS No. 92396-88-8) (Lambda max 775 nm) may be used.

Similarly, radiation absorbing antenna dyes having absorbance maximums at approximately 650 nm that may be incorporated into the present antenna dye package include, but are in no way limited to, dye 724 (3H-Indolium, 2-[5-(1,3-dihydro-3,3-dimethyl-1-propyl-2H-indol-2-ylidene)-1,3-pentadienyl]-3,3-dimethyl-1-propyl-, iodide) "C(lambda max=642 nm), dye 683 (3H-Indolium, 1-butyl-2-[5-(1-butyl-1,3-dihydro-3,3-dimethyl-2H-indol-2-ylidene)-1,3-pentadienyl]-3,3-dimethyl-, perchlorate "C (lambda max=642 nm), dyes derived from phenoxazine such as Oxazine 1 (Phenoxazin-5-ium, 3,7-bis (diethylamino)-, perchlorate) "C (lambda max=645 nm), available from "Organica Feinchemie GmbH Wollen." Appropriate antenna dyes applicable to the present exemplary system and method may also include but are not limited to phthalocyanine dyes with light absorption maximum at/or in the vicinity of 650 nm.

Moreover, radiation antennae which can be incorporated into the present antenna dye package for optimization in the blue (~405 nm) and indigo wavelengths can include, but are not limited to, aluminum quinoline complexes, porphyrins, porphins, and mixtures or derivatives thereof. Non-limiting specific examples of suitable radiation antenna can include 1-(2-chloro-5-sulfophenyl)-3-methyl-4-(4-sulfophenyl)azo-2-pyrazolin-5-one disodium salt (lambda max=400 nm); ethyl 7-diethylaminocoumarin-3-carboxylate (lambda max=418 nm); 3,3'-diethylthiacyanine ethylsulfate (lambda max=424 nm); 3-allyl-5-(3-ethyl-4-methyl-2-thiazolinylidene) rhodanine (lambda max=430 nm) (each available from Organica Feinchemie GmbH Wolfen), and mixtures thereof.

Non-limiting specific examples of suitable aluminum quinoline complexes can include tris(8-hydroxyquinolinato) aluminum (CAS 2085-33-8), and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'-[1,4-phenylenebis(1,3,4-oxadiazole-5,2-diyl)]bis N,N-diphenyl benzeneamine (CAS 184101-38-0), bis-tetraethylammonium-bis(1,2-dicyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH.

Non-limiting examples of specific porphyrin and porphyrin derivatives can include etioporphyrin 1 (CAS 448-71-5), deuteroporphyrin IX 2,4 bis ethylene glycol (D630-9) available from Frontier Scientific, and octaethyl porphrin (CAS 2683-82-1), azo dyes such as Mordant Orange (CAS 2243-76-7), Merthyl Yellow (CAS 60-11-7), 4-phenylazoaniline (CAS 60-09-3), Alcian Yellow (CAS 61968-76-1), available from Aldrich chemical company, and mixtures thereof. Exemplary methods of forming the above-mentioned coating, as well as methods for forming images on the coating are described in further detail below.

Exemplary Coating Formation Method

Figure 2:
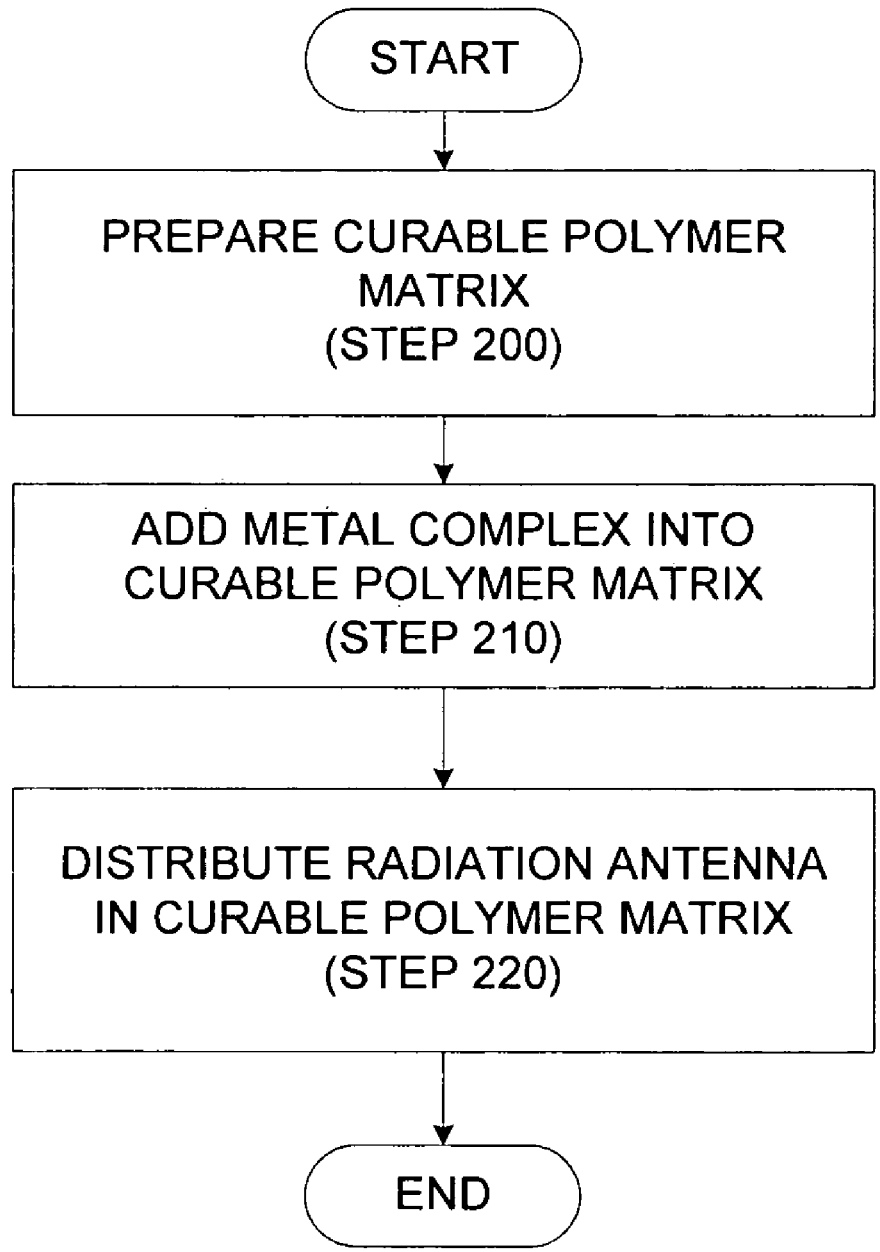
FIG. 2 is a flowchart illustrating a method of forming an image-able composition according to one exemplary embodiment.

FIG. 2 is a flowchart illustrating a method of forming the present radiation image-able coating, according to one exemplary embodiment. In general, a method of forming the image-able coating includes preparing the curable polymer matrix (step 200), adding the metal complex into the curable polymer matrix (step 210), and distributing the radiation antenna in the curable polymer matrix (step 220). Further details of the exemplary coating forming method will now be described in further detail below.

As mentioned with reference to FIG. 2, a first step of the present exemplary coating formation method includes preparing the curable polymer matrix (step 200). According to one exemplary embodiment, the curable polymer matrix is formed by mixing any number of the above-mentioned polymers, monomers, and/or oligomers in a solvent. Additionally, according to one exemplary embodiment, preparation of the curable polymer matrix may also include the addition of a photoinitiator or a catalyst in the solvent to provide for radiation-curability. Further, the dissolution of the above-mentioned components of the curable polymer matrix may be facilitated by the introduction of agitation into the solvent during mixing. Dissolution of the above-mentioned components will provide for a substantially even distribution of the polymers, photoinitiators, and/or catalyst throughout the polymer matrix.

Once the desired curable polymer matrix has been formed (step 200), a metal complex may be added to the curable polymer matrix (step 210). According to one exemplary embodiment, the metal complex is evenly distributed throughout the curable polymer matrix via dissolution and the introduction of agitation.

Along with the metal complex, a radiation absorbing antenna dye may be added to the curable polymer matrix (step 220). According to the present exemplary method, the radiation absorbing antenna dye may be introduced to the curable polymer matrix before or after the introduction of the metal complex. According to one exemplary embodiment, the antenna dyes are dissolved into the curable polymer matrix to provide a substantially even distribution of the antenna dyes throughout the curable polymer matrix.

When the two-phase radiation image-able coating is formed as described above, it may be applied to any number of desired substrates including, but in no way limited to, polymer, paper, ceramic, glass, metal, and the like. According to one exemplary embodiment, the dual band radiation image-able coating may be applied to a desired substrate using any number of known coating systems and methods including, but in no way limited to, doctor blade coating, gravure coating, reverse roll coating, meyer rod coating, extrusion coating, curtain coating, air knife coating, and the like.

Figure 3:
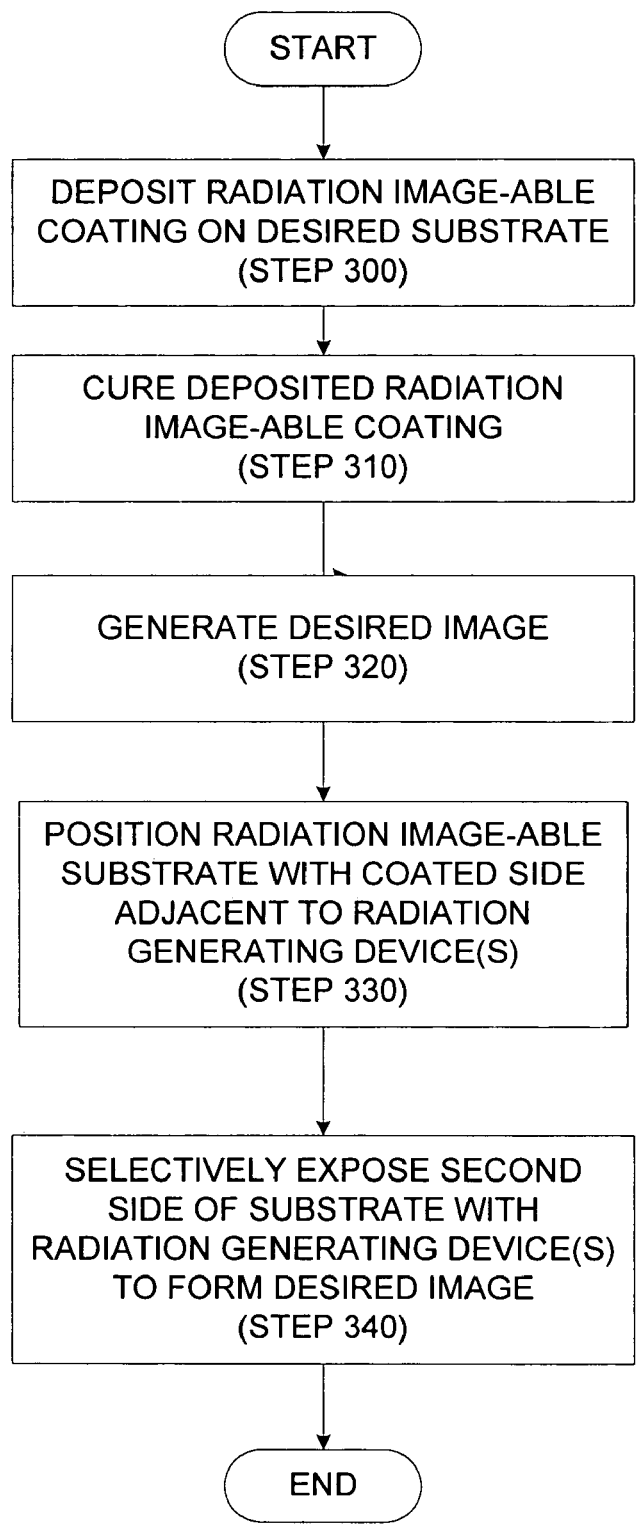
FIG. 3 is a flowchart illustrating a method for forming an image on a radiation image-able coating, according to one exemplary embodiment.

Once the above-mentioned radiation image-able coating is formed, it may be applied to a substrate, such as, a radiation image-able disc (130; FIG. 1). According to one exemplary embodiment, data may be formed on the data surface of the first side (140; FIG. 1) of the radiation imageable disc (130; FIG. 1), and/or a desired image may be formed on the second side (150) via selective radiation exposure. FIG. 3 illustrates one exemplary method for forming a desired image on the second side (150; FIG. 1) of the radiation image-able disc (130; FIG. 1) according to one exemplary embodiment. As illustrated in FIG. 3, the image formation method begins by first depositing the radiation image-able coating on a desired substrate (step 300). As mentioned, the coating may be applied to a desired substrate using any number of known coating systems and methods including, but in no way limited to, doctor blade coating, gravure coating, reverse roll coating, meyer rod coating, extrusion coating, curtain coating, air knife coating, spin coating, screen printing, and the like.

Once the desired substrate has been coated with the above-mentioned image-able coating, the coating is then cured (step 310). According to one exemplary embodiment, the image-able coating may be cured using any number of curing methods known in the art including, but in no way limited to, chemically, thermally, or optically induced free-radical generation; thermal solvent evaporation; or chemical chain extending and/or cross-linking reactions. According to one exemplary embodiment, the curable polymer matrix is cured at a temperature insufficient to reduce the metal complexes into metallic particles, such as less than approximately 100° C.

With the radiation image-able coating formed and cured on the desired substrate, a desired image may be generated (step 320). According to one exemplary embodiment, generating the desired image may include forming a graphical representation of the desired image using any number of user interfaces and computing devices and/or converting the graphical representation into a number of machine controllable commands using the firmware (123; FIG. 1) and/or the processor (125; FIG. 1) of the media processing system (100; FIG. 1).

Continuing with FIG. 3, the radiation image-able disc may then be placed adjacent to the radiation generating device(s) (110; FIG. 1) with the radiation image-able coating in optical communication with the radiation generating device(s) (step 330). With the radiation image-able coating in optical communication with the radiation generating device(s) (step 330), the radiation image-able coating may then be selectively exposed to the radiation generating device(s) to form the desired image (step 340). As mentioned previously, the radiation absorbing antenna dyes distributed in the radiation image-able coating are configured to absorb radiation from the radiation generating device(s) and convert the radiation to heat. According to the present exemplary embodiment, selective exposure of the radiation image-able coating to radiation from the radiation generating device(s) may produce temperatures between approximately 80 and 250° C. As the localized areas are heated, the metal complex and/or metal alloy complexes are reduced to form metallic particles that exhibit a visible contrast to the radiation image-able coating. More specifically, as the localized temperature in the radiation image-able disc is increased, the metal complex and/or metal alloy in the form of a chelate structure begin to melt and the ligands are removed below approximately 220° C., thereby increasing the concentration of metal particles in the image-able coating. As multiple localized areas are heated to form visible metallic particles, the localized temperatures may exceed the sintering temperature of the metal particles, causing the particles to sinter, forming localized areas of conductive contrast that act as pixels to form a desired image.

By using metallic particles rather than traditionally used dyes and activators, the present exemplary system and method incorporate a stable, non-reversible image forming process. Consequently, the above-mentioned metallic particle forming system and method is not subject to a number of issues associated with dye and activator type image-able coatings such as image reversal processes and shelf/archive life background darkening.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A radiation image-able coating, comprising:
   a curable polymer matrix, wherein said curable polymer matrix comprises a radiation curable polymer matrix; and
   a metal complex disposed in said curable polymer matrix, wherein said metal complex is configured to form localized metallic particles when exposed to heat.

2. The coating of claim 1, further comprising an antenna dye package distributed in said curable polymer matrix, wherein said antenna dye package includes an antenna dye that produces heat upon exposure to radiation of specific wavelengths in the infrared, visible or ultraviolet spectrum to help cause formation of said metallic particles.

3. The coating of claim 2, wherein said antenna dye package distributed in said curable polymer matrix has an absorbance maximum wavelength comprising one of approximately 780 nm, approximately 650 nm, or approximately 405 nm.

4. The coating of claim 3, wherein said antenna dye package is configured to generate localized temperatures of between approximately 80° C. and approximately 250° C.

5. The coating of claim 1, wherein said curable polymer matrix comprises a photoinitiator.

6. The coating of claim 1, wherein said curable polymer matrix is configured to form a continuous phase when cured.

7. The coating of claim 1, wherein said metal complex is configured to produce visible metal or metal oxide particles when reduced.

8. The coating of claim 1, wherein said metal complex is configured to undergo rapid reduction to form a plurality of metallic particles at temperatures between approximately 80° C. and approximately 250° C.

9. The coating of claim 1, wherein said curable polymer matrix cures with exposure to ultraviolet radiation.

10. The coating of claim 1, wherein said radiation curable matrix is cured by a form of radiation that does not cause said formation of metallic particles from said metal complex.

11. A radiation image-able coating, comprising:
    a curable polymer matrix; and
    a metal complex disposed in said curable polymer matrix, wherein said metal complex is configured to form localized metallic particles when exposed to heat;
    wherein said metal complex comprises a silver tetraglyme complex.

12. The coating of claim 11, wherein said silver tetraglyme complex comprises a silver hexafluoroacetylacetonate tetraglyme complex.

13. The coating of claim 11, further comprising an antenna dye package distributed in said curable polymer matrix, wherein said antenna dye package includes an antenna dye that produces heat upon exposure to radiation in the infrared, visible or ultraviolet spectrum to help cause formation of said metallic particles.

14. A method of forming a radiation image-able coating comprising:
    preparing a curable polymer matrix having a photoinitiator dissolved therein;
    dispersing a metal complex in said curable polymer matrix, wherein said metal complex is configured to form localized visible metallic particles when exposed to heat; and
    dispersing an antenna dye package in said matrix, wherein said antenna dye package includes an antenna dye that produces heat upon exposure to radiation of specific wavelengths in the infrared, visible or ultraviolet spectrum to help cause formation of said metallic particles.

15. The method of claim 14, further comprising selecting said antenna dye package to have an absorbance maximum wavelength of approximately 780 nm.

16. The method of claim 14, further comprising selecting said antenna dye package to have an absorbance maximum of approximately 650 nm.

17. The method of claim 14, further comprising selecting said antenna dye package to have an absorbance maximum wavelength of approximately 405 nm.

18. The method of claim 14, wherein said preparing a curable polymer matrix comprises:
    providing a solvent;
    dissolving acrylate derivatives, oligomers, or monomers in said solvent; and
    dissolving a photoinitiator in said solvent.

19. The method of claim 14, wherein said dispersing a metal complex in said curable polymer matrix comprises dispersing a metal complex capable of undergoing rapid reduction to metallic particles at temperatures of between approximately 80° C. and approximately 250° C. in said curable polymer.

20. The method of claim 19, wherein said metal complex comprises a silver hexafluoroacetylacetonate tetraglyme.

21. The method of claim 19, wherein said metal complex comprises a silver tetraglyme complex configured to form silver particles when heated to temperatures between approximately 80° C. and approximately 250° C.

22. The method of claim 14, further comprising applying said coating to a desired substrate.

23. The method of claim 22, further comprising curing said applied coating on said substrate;
    wherein said coating is cured by one of a chemically induced free-radical generation, a thermally induced free-radical generation, an optically induced free-radical generation, a thermal solvent evaporation, a chemical chain extending reaction, or a cross-linking reaction.

24. The method of claim 23, wherein said coating is cured at a temperature less than approximately 100° C.

25. The method of claim 14, further comprising curing said matrix with exposure to radiation.

26. The method of claim 25, wherein said radiation is ultraviolet radiation.

27. The method of claim 14, further comprising curing said polymer matrix with heat at a temperature which is insufficient to cause said formation of metallic particles from said metal complex.

28. The method of claim 14, further comprising oxidizing said metal particles.

29. The method of claim 14, further comprising sintering said metal particles together to form a conductive pattern.

30. The method of claim 14, wherein said antenna dye is selected to produce said heat effective to help form said metallic particles when receiving ultraviolet radiation.

* * * * *

UNITED STATES PATENT AND TRADEMARK OFFICE
CERTIFICATE OF CORRECTION

PATENT NO. : 7,498,117 B2 Page 1 of 1
APPLICATION NO. : 11/264620
DATED : March 3, 2009
INVENTOR(S) : William Dorogy et al.

It is certified that error appears in the above-identified patent and that said Letters Patent is hereby corrected as shown below:

In column 7, line 10, delete "2Hindol" and insert -- 2H-indol --, therefor.

In column 7, line 50, delete "cholor" and insert -- chloro --, therefor.

In column 11, line 7, in Claim 16, after "maximum" insert -- wavelength --.

Signed and Sealed this

Twenty-ninth Day of June, 2010

David J. Kappos
*Director of the United States Patent and Trademark Office*